United States Patent
Lu et al.

(10) Patent No.: US 11,076,436 B2
(45) Date of Patent: Jul. 27, 2021

(54) QCI CHANGE VIA BEARER RELEASE AND REESTABLISHMENT

(71) Applicant: T-Mobile USA, Inc., Bellevue, WA (US)

(72) Inventors: Kun Lu, Bellevue, WA (US); Jun Liu, Issaquah, WA (US); Christopher H. Joul, Bellevue, WA (US); Karunakalage Viraj Rakitha Silva, Renton, WA (US); Suresh Thanneeru, Redmond, WA (US); Salvador Mendoza, Issaquah, WA (US); Rahul Pal, Bellevue, WA (US); Egil Gronstad, Encinitas, CA (US); Alan Denis MacDonald, Bellevue, WA (US); Kunal Barawkar, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/218,075

(22) Filed: Dec. 12, 2018

(65) Prior Publication Data
US 2019/0320474 A1 Oct. 17, 2019

Related U.S. Application Data

(60) Provisional application No. 62/657,543, filed on Apr. 13, 2018.

(51) Int. Cl.
*H04W 4/00* (2018.01)
*H04W 76/15* (2018.01)
(Continued)

(52) U.S. Cl.
CPC ........... *H04W 76/15* (2018.02); *H04M 15/66* (2013.01); *H04W 8/04* (2013.01); *H04W 8/08* (2013.01);
(Continued)

(58) Field of Classification Search
CPC ... H04W 72/044; H04W 60/06; H04W 4/005; H04W 28/0268; H04M 15/8016
See application file for complete search history.

(56) References Cited

U.S. PATENT DOCUMENTS

8,989,124 B1 3/2015 Ramamurthy et al.
9,356,911 B1 * 5/2016 Velusamy ........... H04L 63/0281
(Continued)

FOREIGN PATENT DOCUMENTS

KR 20130028931 3/2013
KR 20140080192 6/2014

OTHER PUBLICATIONS

The PCT Search Report and Written Opinion dated Jul. 3, 2019 for PCT Application No. PCT/US2019/023393, 10 pages.

*Primary Examiner* — Abdelillah Elmejjarmi
(74) *Attorney, Agent, or Firm* — Lee & Hayes, P.C.

(57) ABSTRACT

A core network element, such as a PCRF and/or an MME, can determine that a Quality of Service (QoS) Class Indicator (QCI) of particular bearer set up between the core network and user equipment (UE) should be changed to a new QCI. When a control node, such as the MME, determines that no teardown delay conditions are met, the control node can send a bearer release message to a base station that instructs the base station to tear down all bearers for the UE, even if they are in use. In a dual connectivity arrangement, such as a E-UTRAN New Radio-Dual Connectivity (EN-DC) configuration, the base station can instruct a secondary base station to also release all bearers for the UE. The control node can instruct the base station to reestablish the particular bearer with the new QCI when the base station reestablishes the bearers for the UE.

17 Claims, 5 Drawing Sheets

(51) Int. Cl.
*H04W 76/30* (2018.01)
*H04W 28/02* (2009.01)
*H04M 15/00* (2006.01)
*H04W 8/08* (2009.01)
*H04W 8/04* (2009.01)

(52) U.S. Cl.
CPC ... *H04W 28/0252* (2013.01); *H04W 28/0268* (2013.01); *H04W 76/30* (2018.02)

(56) References Cited

U.S. PATENT DOCUMENTS

| | | | |
|---|---|---|---|
| 2012/0182859 A1* | 7/2012 | Ikeda | H04L 1/1835 |
| | | | 370/216 |
| 2012/0196566 A1 | 8/2012 | Lee et al. | |
| 2013/0170350 A1* | 7/2013 | Sarkar | H04L 47/2475 |
| | | | 370/235 |
| 2014/0211619 A1* | 7/2014 | Suryavanshi | H04W 76/38 |
| | | | 370/230 |
| 2015/0029975 A1 | 1/2015 | Oberg et al. | |
| 2017/0163821 A1* | 6/2017 | Payette | H04M 15/8214 |
| 2017/0251410 A1* | 8/2017 | Comstock | H04W 36/14 |
| 2018/0262622 A1* | 9/2018 | Wang | H04L 5/14 |
| 2018/0368038 A1* | 12/2018 | Reddiboyana | H04W 36/14 |
| 2019/0261234 A1* | 8/2019 | Park | H04W 36/0069 |

* cited by examiner

QCI CHANGE VIA BEARER RELEASE AND REESTABLISHMENT

RELATED APPLICATIONS

This U.S. patent application claims priority to provisional U.S. Patent Application No. 62/657,543, entitled "MME Helped eRAB Release During eRAB Modification Failure in 5G Option 3X EN-DC," filed on Apr. 13, 2018, the entirety of which is incorporated herein by reference.

BACKGROUND

User equipment (UE) can connect to a telecommunication network to engage in communication sessions associated with various services, such as voice calls, video calls, media streaming, data downloads, and/or other services. The telecommunication network can attempt to deliver data for such services at various Quality of Service (QoS) levels by placing the data on different bearers associated with different QoS Class Identifiers (QCIs).

A bearer's QCI can indicate target attributes that, if achieved, would result in desired QoS level for traffic of that bearer. For example, data for a voice call can be placed on a dedicated bearer with a QCI of 1, while web browsing data and other types of user data can be placed on a default bearer with a lower priority QCI of 6. Network elements can accordingly prioritize data packets associated with the voice call over other data packets due to the voice call data packets being on a bearer with a higher priority QCI.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

A telecommunication network can include various network elements, including nodes of a core network and multiple base stations of an access network connected to the core network. User equipment (UE) can connect to one or more of the base stations to access the core network. For example, in a Long Term Evolution (LTE) network, a base station can be an evolved NodeB (eNB) and the core network can be an Evolved Packet Core (EPC). The UE can engage in one or more services through its connection to the telecommunication network, including voice calls, video calls, media streaming, data downloads, and/or other services.

The telecommunication network can attempt to deliver traffic for such services at one or more Quality of Service (QoS) levels. QoS can reflect performance metrics of how traffic is being delivered, including attributes such as: throughput, latency, jitter, error rate, packet drop rate, and/or other parameters. For example, a telecommunication network can attempt to transport data for voice calls at a high QoS level that prioritizes low latency. However, because users may be more likely to notice even a small delay during a voice call than if a similar delay causes a web page to load more slowly, the telecommunication network can target a lower QoS level that allows a larger latency for general web browsing traffic.

A telecommunication network can enforce different QoS levels for different types of traffic for the same UE by setting up different bearers between the UE, base stations, gateways, and/or other elements of the telecommunication network. Each bearer can have a QoS Class Identifier (QCI) that indicates target attributes that would result in a desired QoS level for traffic of that bearer. For example, a particular QCI value can be associated with specific target attributes such as a guaranteed or non-guaranteed bit rate, a priority level, a packet delay budget, a packet error loss rate, and/or any other target attribute.

A telecommunication network can set up one or more default bearers when a UE connects to the telecommunication network, which can stay in place while the UE is connected to the telecommunication network. For example, one default bearer with a QCI of 6 can be set up for a UE, which can be used to transport general Internet data, such as email data, web page data, file transfer data, and/or any other types of user data. Another default bearer with a QCI of 5 could also be set up to transport IP Multimedia Subsystem (IMS) signaling data at a higher priority level than general Internet data.

The telecommunication network can also set up one or more dedicated bearers with different QCI values for traffic of certain services. For example, when a UE is engaged in a voice call, a dedicated bearer with a QCI of 1 can be set up to transport voice call data. The QCI of 1 can indicate that the voice call data should be transported at a high priority level and at a minimum guaranteed bitrate, whereas a QCI of 6 used for a default bearer for Internet traffic may have a lower priority level and a non-guaranteed bitrate. Accordingly, network elements can prioritize delivery of the voice call data on the QCI 1 dedicated bearer over delivery of general Internet data on the QCI 6 default bearer.

Although a bearer can initially be set up to have a particular QCI, in some cases a telecommunication network may want to change the bearer's QCI. For example, when a subscriber's UE is streaming a large amount of video over a default bearer with a QCI of 6, causing the subscriber to reach a data limit tied to their subscription plan, the telecommunication network may want to change the default bearer's QCI from 6 to a lower priority QCI of 9. Accordingly, by changing the default bearer to have a QCI of 9, network elements may give that subscriber's data less priority if the telecommunication network becomes congested. In other situations, a telecommunication network may want to change a particular bearer's QCI to a higher priority QCI.

To attempt a modification on an existing bearer's QCI, a core network element can send a message to a base station requesting that the base station modify the bearer's QCI. However, in some cases the base station cannot carry out that requested QCI modification, and that bearer would remain in place with an unmodified QCI. For example, the base station may experience an error that prevents it from modifying the bearer's QCI. As another example, when a base station is linked to another base station and the UE is connected to both base stations, such as in a E-UTRAN New Radio-Dual Connectivity (EN-DC) configuration, and only one of the two base stations has a control plane link to the core network, the base station that receives a bearer modification request from the core network may not be able to communicate the requested QCI change to the other base station to which it is linked, such that the other base station would not know that the bearer's QCI is to be changed. If the bearer's QCI cannot be modified, it may remain in place with the original, unmodified QCI until the UE disconnects from a base station. This can be undesirable from the network's perspective, as a subscriber that is using the telecommunication network to download more data over a bearer during a session than a usage limit allows may be able to maintain the session over the bearer with an unchanged QCI for long periods of time.

This disclosure describes systems and processes in which a core network element of the telecommunication network can cause an effective change in an existing bearer's QCI even if the bearer's QCI cannot be directly modified by a base station and the bearer is still in use. The core network element can cause this effective QCI change in a particular bearer by instructing a base station to have all existing bearers for a UE torn down, even if those bearers are in use. In some cases, the core network element can wait until the only bearers currently in use by the UE are considered safe to at least temporarily interrupt. The UE can respond to the teardown of the bearers by reconnecting to the telecommunication network, prompting reestablishment of the bearers. The telecommunication network can reestablish the bearers for the UE, however the particular bearer that the core network element wanted to modify can be reestablished with a new, different QCI as desired, thereby resulting in an effective change in the bearer's QCI.

Example Environments

Figure 1:
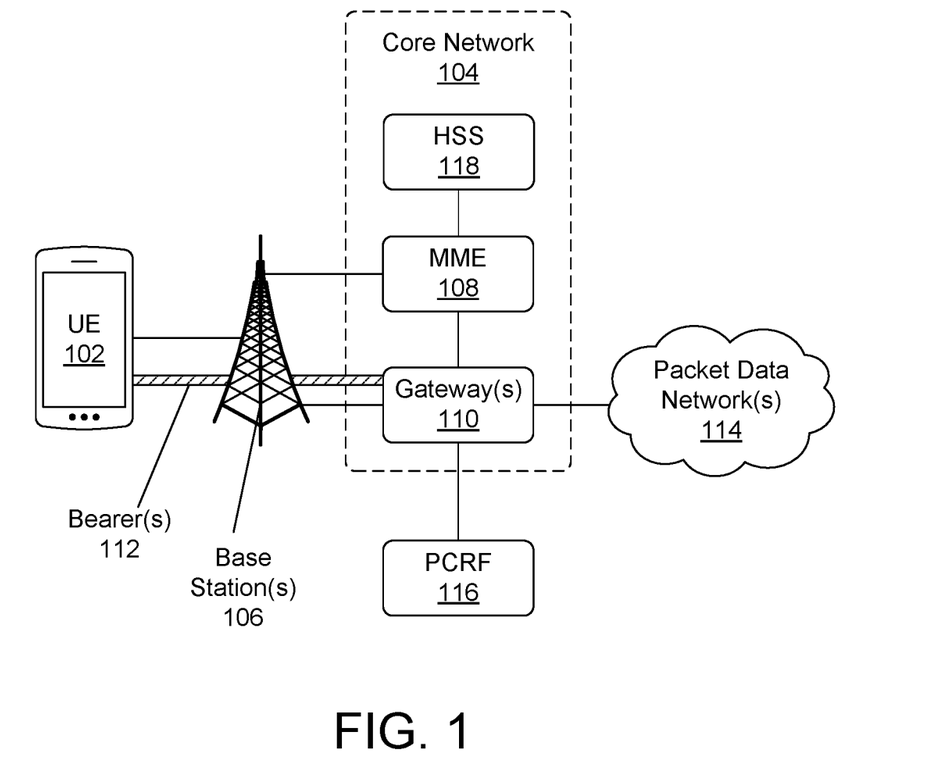
FIG. 1 depicts an exemplary environment in which user equipment (UE) can connect to a telecommunication network.

FIG. 1 depicts an exemplary environment in which user equipment (UE) 102 can connect to a telecommunication network to make or receive calls, transmit or receive data, and/or perform any other network operation. A UE 102 can be any device that can wirelessly connect to the telecommunication network. For example, a UE 102 can be a smart phone, a cellular phone, a personal digital assistant (PDA), a personal computer (PC), a laptop, a desktop, a workstation, a media player, a tablet, a gaming device, a smart watch, or any other type of computing or communication device.

The telecommunication network can include a core network 104 that is connected to a radio access network that includes multiple base stations 106. The core network 104 and/or base stations 106 can be compatible with one or more wireless access technologies, such as fifth generation (5G) technologies, Long Term Evolution (LTE)/LTE Advanced technology, High-Speed Data Packet Access (HSDPA)/ Evolved High-Speed Packet Access (HSPA+) technology, Universal Mobile Telecommunications System (UMTS) technology, Code Division Multiple Access (CDMA) technology, Global System for Mobile Communications (GSM) technology, and/or any other previous or future generation of wireless access technology.

In some examples, the core network 104 and/or any of the base stations 106 can be LTE elements. An LTE core network 104 can be referred to as an Evolved Packet Core (EPC). An LTE base station 106 can be referred to as an evolved Node B (eNB). Multiple eNBs can be part of a radio access network known as an Evolved Universal Mobile Telecommunications System (UMTS) Terrestrial Radio Access Network (E-UTRAN), through which UEs 102 can access the EPC.

In other examples, the core network 104 and/or any of the base stations 106 can be 5G elements. 5G elements can also be referred to as 5G NR (New Radio) elements. A 5G base station 106 can be referred to as a gNB. In some cases, base stations 106 of one wireless access technology generation can be connected to a core network 104 of another wireless access technology generation. For example, as will be discussed below, in some examples a 5G gNB can be connected to an LTE EPC.

In some examples, a UE 102 can use multiple antennas to connect to multiple base stations 106 linked to the same core network 104 to increase throughput, improve reliability, and/or for other reasons. For example, in some cases when a UE 102 is connected to multiple bases stations 106, the different base stations 106 can send different packets to the UE 102 using different frequencies to increase throughput to the UE 102. While in some cases a UE 102 can connect to multiple base stations 106 via the same wireless access technology, in other cases a UE 102 can connect to multiple base stations 106 via different wireless access technologies. For example, when an LTE EPC is connected to both LTE eNBs and 5G gNBs, a compatible UE 102 can connect to both an eNB and a gNB, as will be discussed below with respect to FIG. 2.

A core network 104, such as an LTE EPC, can include multiple components including a Mobility Management Entity (MME) 108 and one or more gateways 110. An MME 108 can be a control node that can manage bearers 112 for network traffic to and from a UE 102, as will be described further below. Example architecture for an MME 108 is illustrated in greater detail in FIG. 4, and is described in detail below with reference to that figure. Gateways 110 can include Serving Gateways (S-GWs) that link the core network 104 to base stations 106. Gateways 110 can also include Packet Data Network (PDN) Gateways (P-GWs) that link the core network 104 to one or more PDNs 114, such as an IP Multimedia Subsystem (IMS), the Internet, and/or other networks and servers.

Gateways 110 can also be linked to a Policy and Charging Rules Function (PCRF) 116. A PCRF 116 can provide the core network 104 with Policy and Charging Control (PCC) rules based on a type or identity of a subscriber, a service type, a desired Quality of Service (QoS) level, and/or any other factor. PCC rules can define how the core network 104 and/or base stations 106 should treat or prioritize data packets, such as specifying that data packets of a communication session should be given a certain priority level, be transmitted at least at a minimum bitrate, be transmitted on certain bearers 112, and/or be treated in any other specified way. In some examples, PCC rules can also define how a customer account is to be charged based on how data packets are transmitted or treated during a communication session.

Information about PCC rules for a subscriber and/or service, including applicable QoS parameters, can be communicated from gateways 110 to the MME 108. The MME 108 can also receive subscription data for a particular subscriber, including applicable QoS parameters, from a Home Subscriber Server (HSS) 118. As will be described below, the MME 108 can use such QoS parameters to determine QoS Class Indicators (QCIs) for individual bearers 112.

One or more bearers 112 can be set up for communications between a particular UE 102 and a telecommunication network. Bearers 112 can be virtual channels that the telecommunication network can use to transport data for a UE 102 between network elements. Bearers 112 can be set up between adjacent network elements. For example, an S-GW can be linked to an eNB via an S1 bearer over an S1 interface, while the eNB can also be linked to a UE 102 over a data radio bearer. Bearers 112 can also be considered to exist between non-adjacent network elements that pass through intermediate network elements. For example, an E-UTRAN Radio Access Bearer (E-RAB) can be established between the S-GW and the UE 102, with the E-RAB including an S1 bearer between the S-GW and an eNB, and a data radio bearer between the eNB and the UE 102.

Multiple bearers 112 can be set up between the same network elements for different types of traffic for the same UE 102. For example, a telecommunication network can set up a first default bearer 112 for general Internet data and a second default bearer 112 for IMS signaling, as well as dedicated bearers 112 for traffic of specific services. For instance, a dedicated bearer 112 can be set up for voice call data when the UE is engaged in a voice call.

Bearers 112 can be set up between network elements in part based on information from the MME 108 that indicates QCIs for the bearers 112. The value of a bearer's QCI can indicate how network elements should treat traffic associated with that bearer 112. QCIs can indicate various specific target QoS attributes, including a guaranteed or non-guaranteed bit rate, a priority level, a packet delay budget, a packet error loss rate, and/or any other target QoS attribute. For example, 3GPP has multiple standardized QCI values that define specific attributes, including a QCI of 1 that indicates a guaranteed bit rate with a priority level of 2, a QCI of 5 that indicates a non-guaranteed bit rate with a priority level of 1, a QCI of 6 that indicates a non-guaranteed bit rate with a priority level of 6, and a QCI of 9 that indicates a non-guaranteed bit rate with a priority level of 9.

Different bearers 112 for the same UE 102 can be given different QCI values, such that traffic on different bearers 112 are treated differently according to the bearer's QCI. For example, a default bearer 112 set up for general Internet data can have a QCI of 6, a default bearer 112 for IMS signaling can have a QCI of 5, and a dedicated bearer 112 for a voice call can have a QCI of 1. Accordingly, because the voice call bearer's QCI has a higher priority level than the QCI of the default bearer for general Internet data, network elements can prioritize transporting the voice call data over general Internet data if there are not enough resources to transport both types of traffic.

A control node, such as an MME 108, can instruct other network elements, including gateways 110 and base stations 106 to set up specific bearers 112 with QCI values based on QoS parameters known to the control node. For example, as described above, the MME 108 may receive information about a subscription plan and associated QoS parameters from an HSS 118, and/or QoS parameters originating from a PCRF 116 via gateways 110 about a type of service associated with a bearer 112.

In some situations, a MME 108 or other control node can determine that an existing bearer's QCI should be changed. As one non-limiting example, an MME 108 may want to change the QCI of a default bearer 112 from 6 to 9, which can lower the priority given by network elements to traffic of that bearer 112. As will be explained in more detail below, in some cases the telecommunication network can force a QCI change in an existing bearer 112 by causing the existing bearer 112 to be torn down so that it will be reestablished with a different QCI.

Figure 2:
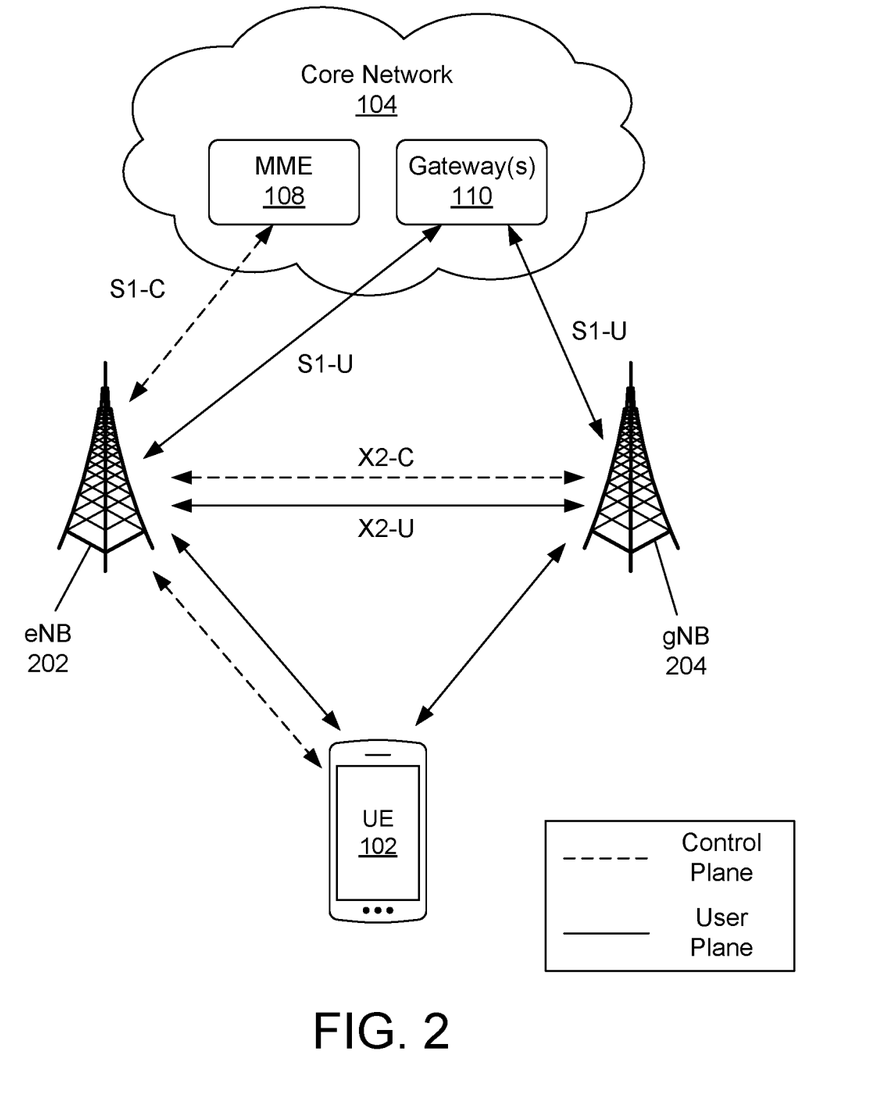
FIG. 2 depicts a telecommunication network with a E-UTRAN New Radio-Dual Connectivity (EN-DC) configuration.

FIG. 2 depicts a telecommunication network with a E-UTRAN New Radio-Dual Connectivity (EN-DC) configuration. In an EN-DC configuration, an LTE eNB 202 can be connected to a 5G gNB 204 over a link, such as an X2 interface, Xx interface, or Xn interface. When a UE 102 is connected to both the eNB 202 and gNB 204, the link between them can allow the eNB 202 and gNB 204 to coordinate their communications with the UE 102, such as by each transmitting different data packets to the UE 102 to increase throughput, by each transmitting copies of the same data packets to increase reliability, and/or by coordinating their communications with the UE 102 in any other way.

FIG. 2 depicts an example of 3GPP's "option 3x" for a EN-DC configuration, which can be similar to "option 3," "option 3a," and other EN-DC configurations. In these EN-DC configurations, the core network 104 can be an LTE EPC, the eNB 202 can serve as a master node, and the linked gNB 204 can serve as a secondary node. As the master node, the eNB 202 can be linked via a control plane interface, such as an S1-C interface, to an MME 108 of the LTE EPC for control plane signaling. In some cases, the eNB 202 can also be linked to a gateway 110 via a user plane interface, such as an S1-U interface, for transfer of user plane data. In some examples, the gNB 204 can also be linked to the LTE EPC via a user plane interface, such as an S1-U interface, for transfer of user plane data. 3GPP also defines "option 4" EN-DC configurations in which the core network 104 is a 5G core network, the gNB 204 serves as a master node linked to the 5G core network for control plane data and possibly user plane data, and the eNB 202 serves as a secondary node for user plane data. Other dual connectivity (DC) configurations can also exist, such as an inter-LTE DC configuration in which one eNB 202 serves as a master node and is connected to one or more other eNBs 202 that serve as secondary nodes.

As described above, in an "option 3/3a/3x" EN-DC configuration, the eNB 202 serves as the master node. Accordingly, control plane data flows through the eNB 202. For example, the eNB 202 can establish control plane signaling links over control plane interfaces with the MME 108, the gNB 204, and the UE 102, as shown by the dashed lines in FIG. 2. The control plane signaling link between the eNB 202 and the MME 108 can use a control plane interface, such as an S1-C interface, in which messages are exchanged using a protocol known as S1-AP (S1 Application Protocol). In some cases, an S1-C interface between an eNB 202 and an MME 108 can also be referred to as an S1-MME interface. Because control plane data flows through the master eNB 202 in this EN-DC configuration, no S1-C interface exists directly between the secondary gNB 204 and the MME 108. However, some types of control plane signaling can be exchanged between the eNB 202 and the gNB 204 over a control plane signaling link established via another type of control plane interface, such as an X2-C interface or Xx-C interface.

Control plane messages sent between the eNB 202 and the gNB 204 may use a different protocol or format than control plane messages sent between the eNB 202 and the MME 108. For example, messages sent over an X2-C interface can use a protocol known as X2-AP (X2 Application Protocol), which may be incompatible with S1-AP messages sent between the eNB 202 and the MME 108 over an S1-C interface. Because the S1-C interface uses a different messaging protocol than the X2-C interface, in some cases the eNB 202 may be unable to forward S1-AP messages it receives from the MME 108 on to the gNB 204, as will be discussed further below.

Although control plane signaling can flow through the eNB 202 as described above, user plane data may or may not flow through the eNB 202. For example, the eNB 202 and the gNB 204 can establish a link through which they can exchange user plane data over a user plane interface, such as an X2-U interface or Xx-U interface. User plane links can also be established over S1-U interfaces between gateways 110 of the core network 104 and at least one of the eNB 202 and gNB 204, such that the eNB 202 and/or gNB 204 can exchange user plane data with the core network 104 directly. User plane interfaces between elements are shown by solid lines in FIG. 2.

Bearers 112, such as E-RABs, can be established from the core network 104 to a UE 102 when a UE 102 connects to the eNB 202 and/or gNB 204. For example, an E-RAB for user plane data can be established that includes an S1 bearer from a S-GW to an eNB 202 and a data radio bearer from the eNB 202 to the UE 102. If the UE 102 is also connected to a linked gNB 204, a similar E-RAB can be established through the gNB 204. In some cases, one or both the eNB 202 and the gNB 204 can have distinct bearers 112 set up with the UE 102. In other cases, the eNB 202 and the gNB 204 can share a split bearer 112 set up through both of them with the UE 102.

These bearers 112 can each be established with a specific QCI, as discussed above. For example, the MME 108 can use the control plane link to instruct the eNB 202 to set up one or more bearers with a UE 102 that have particular QCIs. The eNB 202 can in turn share information with the gNB 204 over a control plane link so that the gNB 204 can also establish bearers 112 with the UE 102 that have the particular QCIs specified by the MME 108.

In some situations, an MME 108, a PCRF 116, or another network element can determine that the QCI of an existing bearer 112 for a particular UE 102 should be changed. A determination that an existing bearer's QCI should be changed can be made for any reason, but may be based on data tracked or analyzed by the MME 108, PCRF 116, or another network element, and/or on QoS parameters for a particular subscriber and/or service.

For example, the MME 108, PCRF 116, and/or other network element may have subscription information indicating that a particular subscriber's service plan has a specific monthly data limit that, if exceeded, may allow the telecommunication network to throttle the subscriber's data. The MME 108, PCRF 116, and/or other network element can accordingly track the subscriber's data usage during a month to determine if UEs 102 associated with the subscriber have exceeded the monthly data limit, or be notified by other network elements that the subscriber's monthly data limit has been exceeded. If the subscriber exceeds the monthly data limit, the MME 108, PCRF 116, or other network element can determine that a default bearer 112 for general Internet data should have its QCI changed from a default QCI to another QCI that reflects a lower priority level, a lower guaranteed bitrate, a higher latency tolerances, or treats the traffic of the bearer 112 differently in any other way.

For instance, a default bearer 112 for a UE's general Internet data may have been established with a QCI of 6, which may be a default QCI for that type of bearer 112. When the MME 108, PCRF 116, or other network element determines that a subscriber account associated with the UE 102 has exceeded a monthly data limit tied to the subscriber account, the MME 108, PCRF 116, or other network element can determine that bearer's QCI should be changed from 6 to 9. In some cases, a QCI of 9 can still allow the subscriber to download data, but may cause network elements to give that data less priority in certain situations. For example, when network resources become congested, a network element may favor traffic for one UE 102 associated with a bearer 112 having a QCI of 6, while throttling traffic for another UE 102 associated with a bearer 112 having a QCI of 9. In this example, when the month ends and the subscriber's monthly data limit resets, the MME 108, PCRF 116, or other network element can similarly determine that the bearer's QCI can be changed back from 9 to the default QCI of 6.

Changing a bearer's QCI from 6 to 9, or from 9 to 6, based on usage limits is only one example. The MME 108, PCRF 116, or other network element can choose to modify an existing bearer's QCI from any first QCI to any second QCI, for any reason. For example, an MME 108, PCRF 116, or other network element may choose to modify an existing bearer's QCI if a subscriber pays, or fails to pay, for a service plan that guarantees data transfers at a certain bitrate. As another example, an MME 108, PCRF 116, or other network element may choose to modify an existing bearer's QCI if the telecommunication network determines that a UE 102 is using the bearer 112 for a service that needs a higher or lower QoS. For instance, when a PCRF 116 supplies a gateway 110 new PCC rules with new QoS parameters for a particular service, the new QoS parameters can be shared with the MME 108 or other network element. The MME 108 or other network element can determine that an existing bearer's QCI should be modified to reflect the new QoS parameters.

Figure 3:
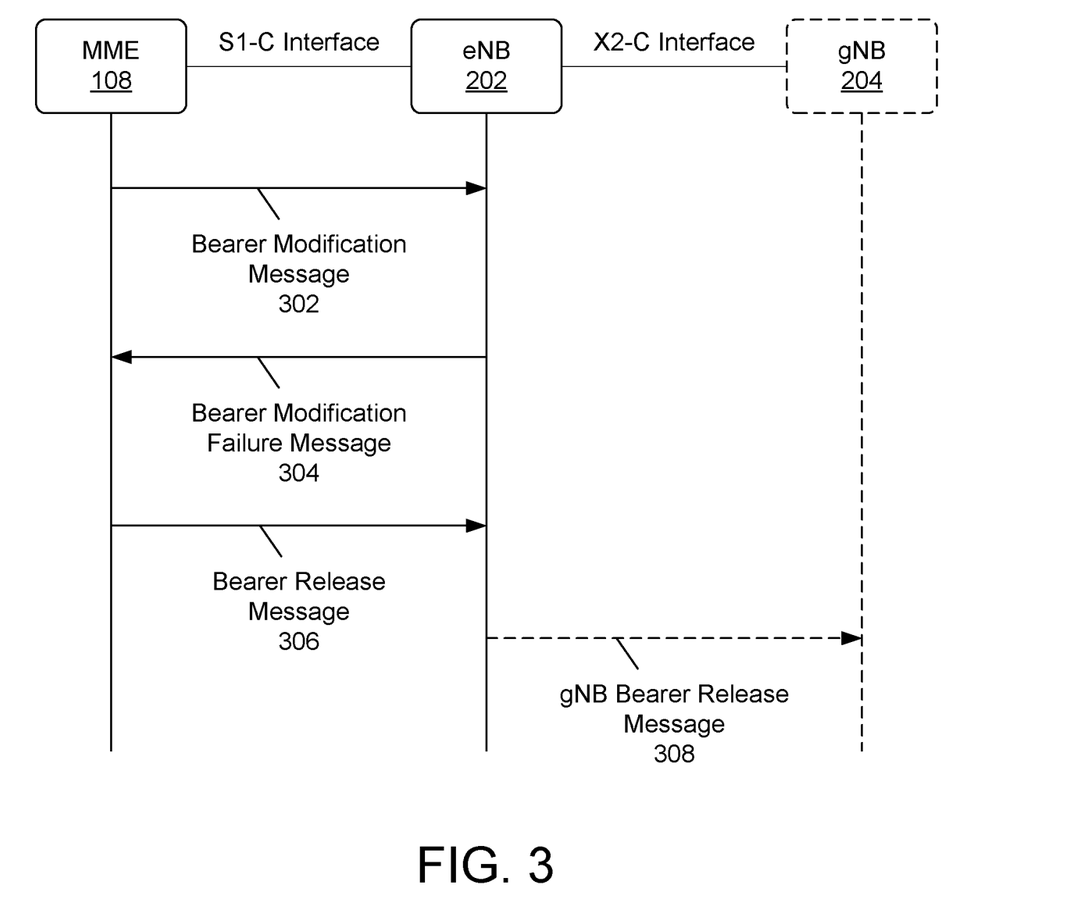
FIG. 3 depicts a message sequence chart showing control plane messages that a telecommunication network can use to cause a change in an existing bearer's QoS Class Indicator (QCI).

FIG. 3 depicts a message sequence chart showing control plane messages that a telecommunication network can use to cause a change in an existing bearer's QCI. Some of the control plane messages can be sent over a control plane interface between an MME 108 and an eNB 202, such as an S1-C interface, and can accordingly be sent using the S1-AP messaging protocol.

When an MME 108, PRCR 116, or other network element determines that the QCI of an existing bearer 112 should be changed, the MME 108 can send a bearer modification message 302 to an eNB 202 over a control plane link, such as an S1-C interface. If a PCRF 116 or other network element determines that the bearer's QCI should be changed, it can inform the MME 108 such that the MME 108 sends the bearer modification message 302. In some examples, the bearer modification message 302 can be a 3GPP E-RAB MODIFY REQUEST message. The bearer modification message 302 can identify one or more bearers 112, such as E-RABs, that should be modified to have a new QCI, as well as an indicator of that new QCI.

When the eNB 202 receives a bearer modification message 302 from the MME 108 indicating that a bearer's QCI should be changed, in some cases the eNB 202 may experience an error that prevents it from modifying the bearer's QCI as requested.

In other situations, the bearer modification 302 message may not reach a gNB 204 operating as a secondary node. As discussed above, there may be no direct control plane interface, such as an S1-C interface, between the MME 108 and a gNB 204, such that the MME 108 cannot send a bearer modification message 302 directly to the gNB 204. The eNB 202 may receive the bearer modification message 302 in this situation, but be unable to pass the bearer modification message 302 to the gNB 204 due to incompatibilities between the control plane links between the MME 108 and eNB 202 and between the eNB 202 and the gNB 204. For instance, although a bearer modification message 302, such as an E-RAB MODIFY REQUEST, may be defined in the S1-AP protocol for transmission over an S1-C interface between the MME 108 and the eNB 202, there may be no corresponding bearer modification message 302 defined in the messaging protocol for the X2-C interface or other interface between the eNB 202 and the gNB 204. Because the eNB 202 cannot instruct the gNB 204 to modify an existing bearer's QCI as requested by the MME 108 due to this incompatibility, the requested bearer modification can fail and the eNB 202 and the gNB 204 can maintain the bearer's current QCI.

If the eNB 202 cannot effectuate a change of an existing bearer's QCI for any reason, such as if it experienced an error itself or cannot instruct a linked gNB 204 to change a bearer's QCI, the eNB 202 can return a bearer modification failure message 304 to the MME 108. The bearer modification failure message 304 can be sent to the MME 108 from the eNB 202 over a control plane link, such as an S1-C interface. In some examples, the bearer modification failure message 304 can be a 3GPP E-RAB MODIFY RESPONSE message. The bearer modification failure message 304 can identify one or more bearers 112 that could not be modified as requested in a bearer modification message 302. In some examples, the bearer modification failure message 304 can also include a cause code or value that indicates a reason why a requested QCI change or other requested bearer 112 modification could not be completed, such as "No S1 link to gNB," "Radio resources not available," or "Failure in the Radio Interface Procedure."

When the MME 108 receives a bearer modification failure message 304 indicating that a requested change in a bearer's QCI could not be completed, the MME 108 can send a bearer release message 306 back to the eNB 202 over a control plane link, such as an S1-C interface. The bearer release message 306 can indicate that all bearers for the UE 102 should be torn down. In some examples, the bearer release message 306 can be a 3GPP E-RAB RELEASE COMMAND message. In particular, the bearer release message 306 can indicate that all bearers 112 for the UE 102 should be torn down even if the UE 102 is still using those bearers 112 to send or receive data. Accordingly, as will be described below, in some cases the MME 108 can wait to send a bearer release message 306 until it determines that the only bearers 112 currently in place for a UE 102 are bearers 112 that are safe to at least temporarily interrupt.

The MME 108 can maintain context information about the bearers 112 that were in place when it sent the bearer release message 306, such that the context information can be used to help reestablish the bearers 112 after they are torn down. However, the MME 108 can adjust the context information to reflect a changed QCI for the bearer 112 it wanted to modify with the bearer modification message 302.

When the eNB 202 receives a bearer release message 306, it can tear down all of the bearers 112 currently in place for the UE 102. If the eNB 202 is connected to a gNB 204 in an EN-DC configuration, the eNB 202 can also cause the gNB 204 to tear down all bearers for the UE 102. In some examples, the eNB 202 can send a gNB bearer release message 308 to the gNB 204 over a control plane link, such as over an X2-C interface or other interface. Although a control plane message requesting modification of a particular bearer's QCI may not be defined in the control plane messaging protocol used in the control plane link between the eNB 202 and the gNB 204, that control plane messaging protocol may define a message that can cause the gNB 204 to release all bearers 112 for the UE 102.

Because the UE 102 may still have been using bearers 112 established through the eNB 202 and/or the gNB 204 at the time those bearers 112 are torn down, the UE 102 can respond by almost immediately reconnecting to the telecommunication network and requesting that the bearers 112 be reestablished. The MME 108 can instruct the eNB 202 to reestablish the bearers 112 with specific QCI values, and the eNB 202 can in turn cause the gNB 204 to similarly reestablish bearers 112 with the specified QCI values.

Although some of the bearers 112 can be reestablished with the same QCI value they had before they were torn down, the MME 108 can indicate that the particular bearer 112 it had wanted to modify earlier with a bearer modification message 302 should be reestablished at a different QCI value. For example, if the MME 108 had wanted to change a default bearer's QCI from 6 to 9, after all bearers 112 have been torn down the MME 108 can direct the eNB 202 to have the eNB 202 and/or gNB 204 reestablish that default bearer 112 with a QCI of 9. The MME 108 can accordingly force an effective change of a particular bearer's QCI by requesting teardown of all bearers 112 for a UE 102 so that the particular bearer 112 is reestablished with a different QCI.

When a bearer 112 is torn down while it is being used by a UE 102 during a communication session, the teardown may cause at least a temporary disruption in the communication session until the bearer 112 is reestablished with the same or a different QCI. However, in many cases such a temporary disruption may not be noticeable to a user. For example, when a default bearer 112 with a QCI of 6 is being used for media streaming to a UE 102, and that default bearer 112 is torn down and reestablished with a different QCI of 9, the UE 102 may have received enough data in a memory buffer prior to the teardown that it can continue media playback from the buffer without interruption during the time it takes to reestablish the default bearer 112.

In other cases, a user may be more likely to notice a disruption in a communication session when a bearer 112 is torn down and reestablished. For example, if a dedicated bearer 112 for a voice call is torn down alongside teardown of one or more other bearers 112 that the MME 108 wanted to modify, the voice call may be interrupted or disconnected even if the voice call bearer 112 is reestablished relatively quickly.

Accordingly, the MME 108 can be configured to wait to send a bearer release message 306 until it determines that no teardown delay conditions are satisfied. The MME 108 can be configured with one or more teardown delay conditions that define situations in which a bearer release message 306 should not be sent. Teardown delay conditions can indicate that a bearer release message 306 should not be sent if a bearer 112 with a certain QCI is currently in place, if a UE 102 is using a bearer 112 to connect to a certain access point name (APN), or other conditions in which it is not considered safe to send a bearer release message 306.

In many cases, teardown delay conditions can relate to critical and/or low-latency services in which delays in data transfer may be especially noticeable to users. For example, when a telecommunication network uses a dedicated bearer 112 with a QCI of 1 for voice calls, the MME 108 can be configured with teardown delay conditions indicating that a bearer release message 306 should not be sent if a bearer 112 with a QCI of 1 is in place. Accordingly, the MME 108 can wait to send the bearer release message 306 until the voice call ends and the dedicated voice call bearer 112 with the QCI of 1 has been torn down. As another example, a UE 102 can be using a bearer 112 to connect to an APN known to be used for controlling flying drones. Because tearing down that bearer 112 might interrupt a user's control of a flying drone, possibly causing it to crash, the MME 108 can be configured with teardown delay conditions indicating that a bearer release message 306 should not be sent while the UE 102 is connected to the known drone control APN.

As described above, in some examples the bearer modification message 302, the bearer modification failure message 304, and the bearer release message 306 can be used in "option 3/3a/3x" EN-DC configurations in which an eNB 202 serves as a master node and has a control plane link over an S1-C interface with an MME 108 in an LTE EPC.

In an alternate "option 4" EN-DC configuration described above, in which a gNB 204 is a master node with a control plane link to a 5G core network 104 and the eNB 202 is a secondary node, similar types of messages can be sent between a control node of the 5G core network 104 and the gNB 204. For example, the control node of the 5G core network can send a bearer modification message 302 to the gNB 204 requesting a change of an existing bearer's QCI. In some cases, the gNB 204 may return a bearer modification failure message 304 indicating that the requested modification could not be completed, possibly because the gNB 204 could not instruct the secondary eNB 202 to make that change over a control plane link. The control node of the 5G core network could accordingly use a bearer release message 306 to instruct the gNB 204 to tear down all bearers 112 for a UE 102. The gNB 204 can in turn cause the secondary eNB to tear down all bearers 112 for the UE 102, and the torn down bearers 112 can be reestablished. The particular bearer 112 the control node wanted to modify can be reestablished with a new QCI as desired.

As another example, an MME 108 can send a bearer release message 306 to a master eNB 202 in an inter-LTE DC configuration, and the master eNB 202 can cause itself and other secondary eNBs 202 to release bearers 112 for a UE 102 so that at least one can be reestablished with a different QCI.

Example Architecture

Figure 4:
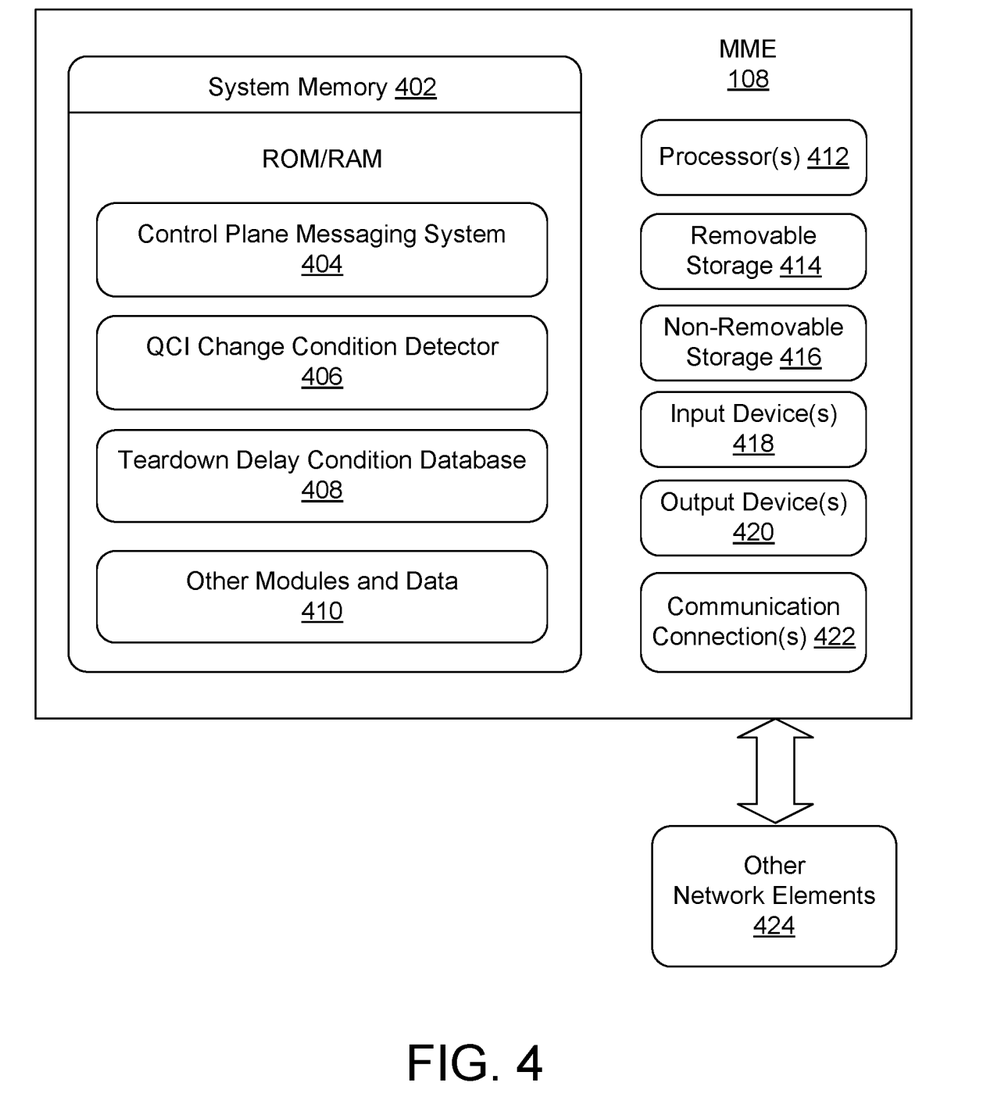
FIG. 4 illustrates an example architecture of a Mobility Management Entity (MME).

FIG. 4 illustrates an example architecture of an MME 108. An MME 108 can be, or can run on, a server or other computing device within a core network 104. An MME 108 can have a system memory 402. The system memory 402 can store applications and/or data for the MME 108, including a control plane messaging system 404, a QCI change condition detector 406, a teardown delay condition database 408, and/or other modules and data 410. The MME 108 can also include processor(s) 412, removable storage 414, non-removable storage 416, input device(s) 418, output device(s) 420, and/or communication connections 422 for communicating with other network elements 424.

In various examples, system memory 402 can be volatile (such as RAM), nonvolatile (such as ROM, flash memory, etc.), or some combination of the two. Example system memory 402 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The control plane messaging system 404 can be configured to exchange control plane messages with a base station 106, such as an eNB 202, over an interface such as an S1-C interface. In some examples, control plane messages sent or received via the control plane messaging system 404 can be formatted using the S1-AP messaging protocol. Control plane messages that can be sent or received by the control plane messaging system 404 include a bearer modification message 302, a bearer modification failure message 304, and a bearer release message 306, as described above with respect to FIG. 3.

The QCI change condition detector 406 can determine when an existing bearer's QCI should be changed, and the new QCI that the bearer 112 should be changed to. In some examples, the QCI change condition detector 406 can determine that an existing bearer's QCI should be changed based on a notification from another network element, such as a PCRF 116, that has determined that such a change should occur. For instance, a PCRF 116 can track a subscriber's monthly data consumption, and send QoS modification instructions to the MME 108 when the subscriber's monthly data consumption exceeds a monthly limit. The MME's QCI change condition detector 406 can evaluate the PCRF's QoS modification instructions and implement a QCI change in an existing bearer as described herein.

In other examples, the QCI change detector 406 can be configured with one or more conditions that can trigger a QCI change in an existing bearer 112. For example, the QCI change condition detector 406 can determine if a subscriber account has exceeded monthly data limit based on information tracked by the QCI change condition detector 406 or other elements of the MME 108, or based on similar information received from a PCRF 116, gateway 110, or other network element, and accordingly determine that a bearer's QCI should be changed to a different QCI. In some cases, the QCI change condition detector 406 can base its decisions at least in part on information received from other network elements, including usage data received from gateways 110 or a PCRF 116, and/or QoS parameters originating from an HSS 118 and/or PCRF 116.

The QCI change condition detector 406 can trigger the control plane messaging system 404 to send a control plane message to an eNB 202. In some cases, the QCI change condition detector 406 can also query or review teardown delay conditions stored in the teardown delay condition database 408 to confirm that no teardown delay conditions are satisfied before causing the control plane messaging system 404 to send a bearer release message 306.

The teardown delay condition database 408 can store information about one or more teardown delay conditions. Teardown delay conditions can define situations in which a bearer release message 306 should not be sent, such as if a certain QCI is currently in place for a UE 102, if a UE 102 is using a bearer 112 to connect to a certain access point name (APN), or other conditions in which it is not considered safe to send a bearer release message 306.

The other modules and data 410 can be utilized by the MME 108 to perform or enable performing any action taken by the MME 108. The other modules and data 410 can include a platform and applications, and data utilized by the platform and applications.

In some embodiments, the processor(s) 412 can be a central processing unit (CPU), a graphics processing unit (GPU), both CPU and GPU, or other processing unit or component known in the art.

The MME 108 can also include additional data storage devices (removable and/or non-removable) such as, for example, magnetic disks, optical disks, or tape. Such additional storage is illustrated in FIG. 4 by removable storage 414 and non-removable storage 416. Computer storage media may include volatile and nonvolatile, removable and non-removable media implemented in any method or technology for storage of information, such as computer readable instructions, data structures, program modules, or other data. System memory 402, removable storage 414 and non-removable storage 416 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the MME 108. Any such computer-readable storage media can be part of the MME 108. In various examples, any or all of system memory 402, removable storage 414, and non-removable storage 416, store programming instructions which, when executed, implement some or all of the above-described operations of the MME 108.

In some examples, the MME 108 can also have input device(s) 418, such as a keyboard, a mouse, a touch-sensitive display, voice input device, etc., and/or output device(s) 420 such as a display, speakers, a printer, etc. These devices are well known in the art and need not be discussed at length here.

The MME 108 can also contain communication connections 422 that allow the MME 108 to communicate with other network elements 424, such as a PCRF 116, an HSS 118, gateways 110, and/or base stations 106. For example, a communication connection 422 can communicate with one or more gateways 110, and the same or a different communication connection 422 can communicate with an eNB 202 over an S-1 interface.

Although FIG. 4 depicts an MME 108 as part of an LTE EPC, when the core network 104 is a 5G core network, a control node of the 5G core network can have an architecture similar to the architecture shown in FIG. 4. For example, a control node of a 5G core network can also have system memory 402 that stores a control plane messaging system 404, a QCI change condition detector 406, a teardown delay condition database 408, and/or other modules and data 410.

Example Operations

Figure 5:
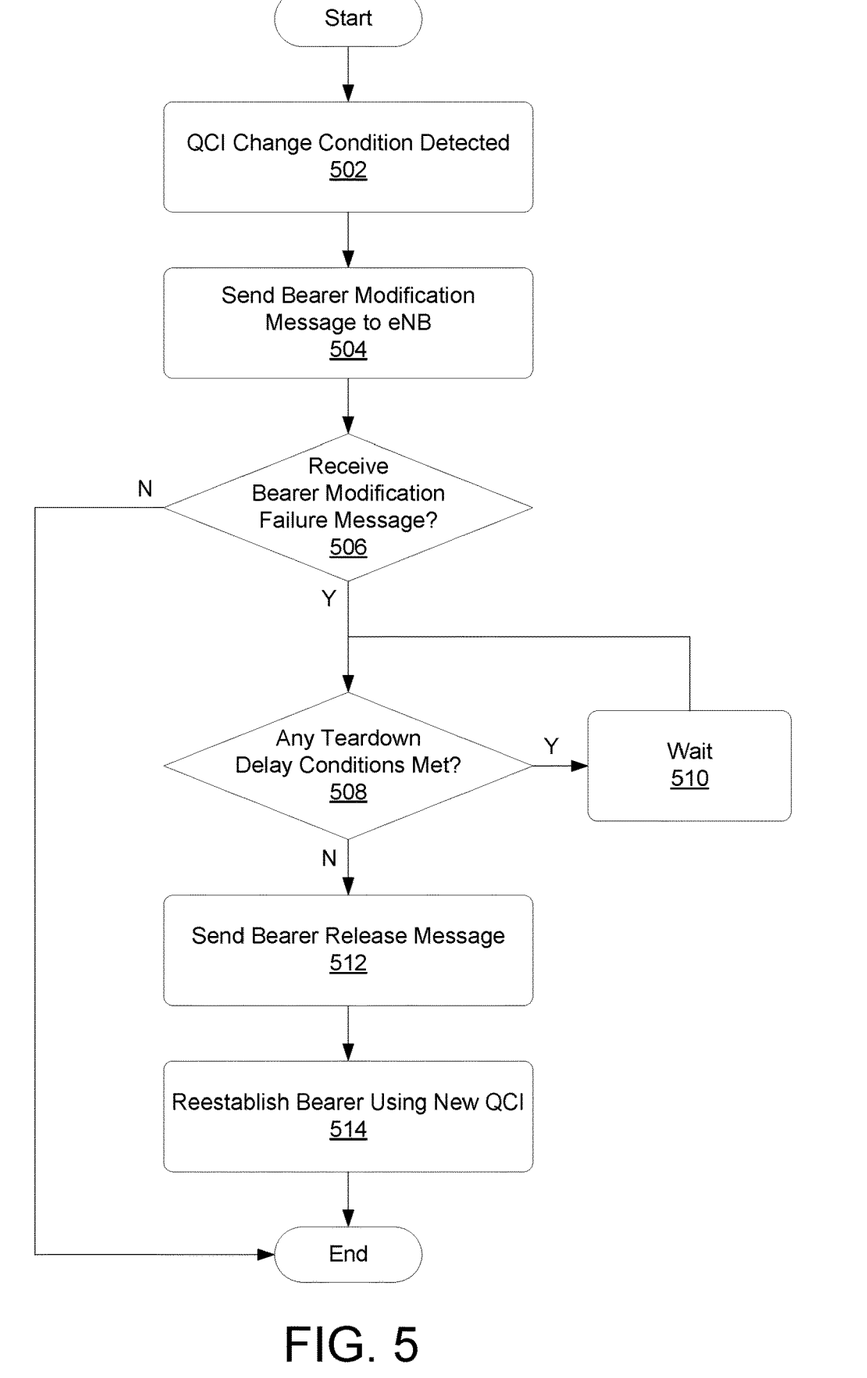
FIG. 5 depicts a flow chart of an exemplary process for causing a QCI change in an existing bearer.

FIG. 5 depicts a flow chart of an exemplary process for causing a QCI change in an existing bearer 112. At block 502, an MME 108 can detect that a QCI change condition has been satisfied for a UE 102. In some examples, the MME 108 an detect that a QCI change condition has been satisfied for a UE 102 based on QoS modification instructions received from a PCRF 116. In other examples, the MME 108 can itself detect that a QCI change condition has been satisfied for a UE 102 based on its own information about bearers 112 set up for the UE 102 and/or associated subscriber accounts, or similar information shared with the MME 108 by a PCRF 116 and/or other network elements. When the MME 108 determines that a QCI change condition has been satisfied for a UE 102, the MME 108 can also determine that a particular bearer's QCI should be changed from first QCI to a second QCI.

At block 504, the MME 108 can send a bearer modification message 302 over an S1-C interface to an eNB 202 associated with the UE 102. The bearer modification message 302 can request that the QCI of the particular bearer 112 be modified to a specific different QCI. For example, the bearer modification message 302 can request that a particular bearer's QCI be changed from 6 to 9.

At block 506, the MME 108 can determine if the eNB 202 returns a bearer modification failure message 304 indicating that it could not change the bearer's QCI as requested in the bearer modification message 302. If the MME 108 does not receive a bearer modification failure message 304, the process can end.

However, in some cases a bearer 112 cannot be modified as requested by a bearer modification message 302, and the eNB 202 will return a bearer modification failure message 304 to the MME 108. As one example, in a EN-DC configuration as shown in FIG. 2, the eNB 202 may not be able to instruct the gNB 204 to change the particular bearer's QCI because no control plane message is defined for the X2-C interface that could pass that instruction. In this situation, because the eNB 202 cannot use its X2-C interface to instruct the gNB 204 to modify the particular bearer's QCI, the requested bearer modification can fail and the eNB 202 can return a bearer modification failure message 304 to the MME 108 over the S1-C interface. As another example, if the eNB 202 itself experiences an error such that the eNB 202 cannot modify the particular bearer's QCI as requested, the eNB 202 can return a bearer modification failure message 304 to the MME 108 over the S1-C interface. Such an error at the eNB 202 might occur even if the eNB 202 is not connected to a gNB 204 in an EN-DC configuration. If the MME 108 receives a bearer modification failure message 304 indicating that the bearer's QCI could not be changed as requested, the MME 108 can move to block 508.

At block 508, the MME 108 can determine if any teardown delay conditions are currently satisfied. If a teardown delay condition is met, the MME 108 can move to block 510 and wait for a predetermined period of time before returning to block 508 to again check if any teardown delay conditions are satisfied. Alternately, the MME 108 can have any other logic for at least periodically checking if any teardown delay conditions are satisfied at block 508. For example, if a teardown delay condition indicates that the MME 108 should wait when a bearer with a QCI of 1 is in place for a UE 102, because a bearer 112 with a QCI of 1 is normally used for voice calls that should not be interrupted, the MME 108 can cycle through blocks 508 and 510 until the voice call has ended and the bearer 112 with a QCI of 1 has been torn down.

If no teardown delay conditions are found to be met during block 508, the MME 108 can move to block 512 and send a bearer release message 306 to the eNB 202. The bearer release message 306 can cause the eNB 202 to tear down all existing bearers 112 for the UE. If the eNB 202 is also connected to a gNB 204 in an EN-DC configuration, the eNB 202 can also cause the gNB 204 to tear down all bearers for the UE 102.

At block 514, the MME 108 can cause the torn down bearers 112 to be reestablished for the UE 102. For example, when bearers 112 for the UE 102 are torn down based on the bearer release message 306, the UE 102 can attempt to reconnect to the telecommunication network. As part of the reconnection, the MME 108 can provide QCI values to the eNB 202 for bearers 112 that are to be reestablished. If the eNB 202 is connected to a gNB, the eNB can also share those QCI values with the gNB 204. In particular, the MME 108 can provide a different QCI value for the bearer 112 that it had wanted to modify during blocks 502 and 504, such that the bearer 112 is reestablished at that different QCI value. The MME 108 can also provide QCI values for one or more other torn down bearers 112 based on the QCI value they had prior to sending the bearer release message 306.

Although blocks 502 through 514 in FIG. 5 are described as being performed by an LTE EPC connected in a control plane to an eNB 202, in other examples, blocks similar to blocks 502 through 514 can be performed by a control node of a 5G core network 104 that is connected in a control plane to a gNB 204.

In some examples, an MME 108 or other control node can be aware that a UE 102 is connected to both an eNB 202 and gNB 204 in an EN-DC configuration, and also be aware that the eNB 202 and gNB 204 are not linked in a way that would allow the master node to instruct the secondary node to modify a particular bearer's QCI in response to a bearer modification message 302. In these examples, the control node can know that a bearer modification message 302 will fail, and accordingly skip blocks 504 and 506 in FIG. 5.

Conclusion

As described above, if the QCI of a particular bearer 112 for a particular UE 102 cannot be modified directly by a base station 106, a core network 104 can effectively force the modification by requesting that the base station 106 release all bearers 112 for the UE 102. The core network 104 can verify that no critical bearers are in place before causing all bearers 112 to be torn down. When the torn down bearers 112 are reestablished for the UE 102, the particular bearer 112 that is to be modified can be reestablished with a new desired QCI.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
   determining, by a control node of a core network, that a particular bearer of one or more bearers set up for a user equipment (UE) is to be modified from having a first Quality of Service (QoS) Class Indicator (QCI) to having a second QCI;
   determining, by the control node, whether at least one of teardown delay conditions are met;
   in response to determining that the particular bearer of the one or more bearers set up for the UE is to be modified from having the first QCI to the second QCI and that no teardown delay conditions are met, sending, by the control node, a bearer release message to a base station connected to the UE, wherein the bearer release message instructs the base station to tear down the one or more bearers for the UE and at least one of the teardown delay conditions indicates that the bearer release message should not be sent while one of the one or more bearers has a third QCI value; and
   instructing, by the control node, the base station to reestablish the particular bearer with the second QCI when the base station reestablishes the one or more bearers for the UE.

2. The method of claim 1, wherein:
   the base station is a master node connected to a second base station serving as a secondary node, the one or more bearers are connected between the UE and at least one gateway of the core network through both the master node and the secondary node, the bearer release message additionally instructs the master node to instruct the secondary node to tear down the one or more bearers, and the instructing includes causing the master node to instruct the secondary node to reestablish the particular bearer with the second QCI when the secondary node reestablishes the one or more bearers for the UE.

3. The method of claim 2, wherein the base station is an LTE evolved NodeB (eNB) and the second base station is a 5G gNB.

4. The method of claim 1, wherein the one or more bearers are E-UTRAN Radio Access Bearers (E-RABs) that are established between a gateway of the core network and the UE.

5. The method of claim 1, wherein at least one of the teardown delay conditions indicates that the bearer release message should not be sent while one of the one or more bearers is connecting the UE to a particular access point name (APN).

6. The method of claim 1, further comprising:
   receiving, by the control node, QoS parameters that originated from at least one of a Home Subscriber Server (HSS) or a Policy and Charging Rules Function (PCRF), wherein the determining, by the control node, that the particular bearer is to be modified from having the first QCI to having the second QCI is based on the QoS parameters.

7. The method of claim 1, further comprising:
   receiving an indication, by the control node, that a subscriber account associated with the UE has reached a monthly data limit, wherein the determining, by the control node, that the particular bearer is to be modified from having the first QCI to having the second QCI is performed in response to determining that the subscriber account has reached the monthly data limit, and wherein the second QCI is associated with a lower priority level than the first QCI.

8. A control node of a core network, comprising:
   one or more processors;
   a communication connection configured to connect to a base station over a control plane interface, wherein one or more bearers are set up through the base station between the core network and a user equipment (UE); and
   memory storing computer-executable instructions that, when executed by the one or more processors, cause the control node to perform operations comprising:
   determining that a particular bearer of the one or more bearers is to be modified from having a first Quality of Service (QoS) Class Indicator (QCI) to having a second QCI;
   determining whether at least one of teardown delay conditions are met;
   in response to determining that the particular bearer of the one or more bearers is to be modified from having the first QCI to the second QCI and that no teardown delay conditions are met, sending a bearer release message to the base station that instructs the base station to tear down the one or more bearers for the UE, wherein at least one of the teardown delay conditions indicates that the bearer release message should not be sent while one of the one or more bearers has a third QCI value; and
   causing the particular bearer to be reestablished by the base station with the second QCI when the base station reestablishes the one or more bearers for the UE.

9. The control node of claim 8, wherein:
the base station is a master node connected to a second base station serving as a secondary node, the one or more bearers are connected between the UE and at least one gateway of the core network through both the master node and the secondary node, the bearer release message additionally instructs the master node to instruct the secondary node to tear down the one or more bearers, and the causing includes causing the master node to instruct the secondary node to reestablish the particular bearer with the second QCI when the secondary node reestablishes the one or more bearers for the UE.

10. The control node of claim 8, wherein at least one of the teardown delay conditions indicates that the bearer release message should not be sent while one of the one or more bearers is connecting the UE to a particular access point name (APN).

11. The control node of claim 8, the operations further comprising:
receiving QoS parameters that originated from at least one of a Home Subscriber Server (HSS) or a Policy and Charging Rules Function (PCRF), wherein the determining that the particular bearer is to be modified from having the first QCI to having the second QCI is based on the QoS parameters.

12. The control node of claim 8, the operations further comprising:
receiving an indication that a subscriber account associated with the UE has reached a monthly data limit, wherein the determining that the particular bearer is to be modified from having the first QCI to having the second QCI is performed in response to determining that the subscriber account has reached the monthly data limit, and wherein the second QCI is associated with a lower priority level than the first QCI.

13. One or more non-transitory computer-readable media storing computer-executable instructions that, when executed by one or more processors of a control node of core network, cause the one or more processors to perform operations comprising:
determining that a particular bearer of one or more bearers set up for a user equipment (UE) is to be modified from having a first Quality of Service (QoS) Class Indicator (QCI) to having a second QCI;
determining whether at least one of teardown delay conditions are met;
in response to determining that the particular bearer of the one or more bearers set up for the UE is to be modified from having the first QCI to the second QCI and that no teardown delay conditions are met, sending a bearer release message to a base station connected to the UE, wherein the bearer release message instructs the base station to tear down the one or more bearers for the UE and at least one of the teardown delay conditions indicates that the bearer release message should not be sent while one of the one or more bearers has a third QCI value; and
instructing the base station to reestablish the particular bearer with the second QCI when the base station reestablishes the one or more bearers for the UE.

14. The one or more non-transitory computer-readable media of claim 13, wherein: the base station is a master node connected to a second base station serving as a secondary node, the one or more bearers are connected between the UE and at least one gateway of the core network through both the master node and the secondary node, the bearer release message additionally instructs the master node to instruct the secondary node to tear down the one or more bearers, and the instructing includes causing the master node to instruct the secondary node to reestablish the particular bearer with the second QCI when the secondary node reestablishes the one or more bearers for the UE.

15. The one or more non-transitory computer-readable media of claim 13, wherein at least one of the teardown delay conditions indicates that the bearer release message should not be sent while one of the one or more bearers is connecting the UE to a particular access point name (APN).

16. The one or more non-transitory computer-readable media of claim 13, the operations further comprising: receiving QoS parameters that originated from at least one of a Home Subscriber Server (HSS) or a Policy and Charging Rules Function (PCRF), wherein the determining that the particular bearer is to be modified from having the first QCI to having the second QCI is based on the QoS parameters.

17. The one or more non-transitory computer-readable media of claim 13, the operations further comprising: receiving an indication that a subscriber account associated with the UE has reached a monthly data limit, wherein the determining that the particular bearer is to be modified from having the first QCI to having the second QCI is performed in response to determining that the subscriber account has reached the monthly data limit, and wherein the second QCI is associated with a lower priority level than the first QCI.

* * * * *